United States Patent [19]

Dore

[11] Patent Number: 4,559,025

[45] Date of Patent: Dec. 17, 1985

[54] UNIVERSAL JOINT WITH BELLOWS SEAL AND VENT

[75] Inventor: Jacques P. Dore, Colombes, France

[73] Assignees: Automobiles Citroen; Automobiles Peugeot, both of Paris, France

[21] Appl. No.: 596,421

[22] Filed: Apr. 3, 1984

[30] Foreign Application Priority Data

Apr. 15, 1983 [FR] France ................................ 83 06512

[51] Int. Cl.$^4$ .............................................. F16D 3/84
[52] U.S. Cl. ................................ 464/175; 277/212 FB
[58] Field of Search ................. 277/212 FB; 464/145, 464/173, 175, 906

[56] References Cited

U.S. PATENT DOCUMENTS

| 4,210,002 | 7/1980 | Dore | 464/175 |
| 4,224,808 | 9/1980 | Gehrke | 464/175 |
| 4,392,838 | 7/1983 | Welschof et al. | 464/175 |

FOREIGN PATENT DOCUMENTS

| 2414144 | 9/1979 | France | 464/175 |
| 826440 | 1/1960 | United Kingdom | 277/212 FB |

*Primary Examiner*—Stuart S. Levy
*Assistant Examiner*—Daniel P. Stodola
*Attorney, Agent, or Firm*—Karl F. Ross; Herbert Dubno

[57] ABSTRACT

A bellows seal for a universal joint has its sleeve surrounding the drive shaft separated from this shaft over only a cylindrical segment by a device communicating between the interior of the sleeve and the external atmosphere. This device has a portion of small circumferential width lying below the sleeve and a portion of large circumferential width integral with the first portion. An axial groove in the first portion communicating with a meandering groove forming a baffle in the second portion before this meandering groove opens into the ambient atmosphere.

6 Claims, 5 Drawing Figures

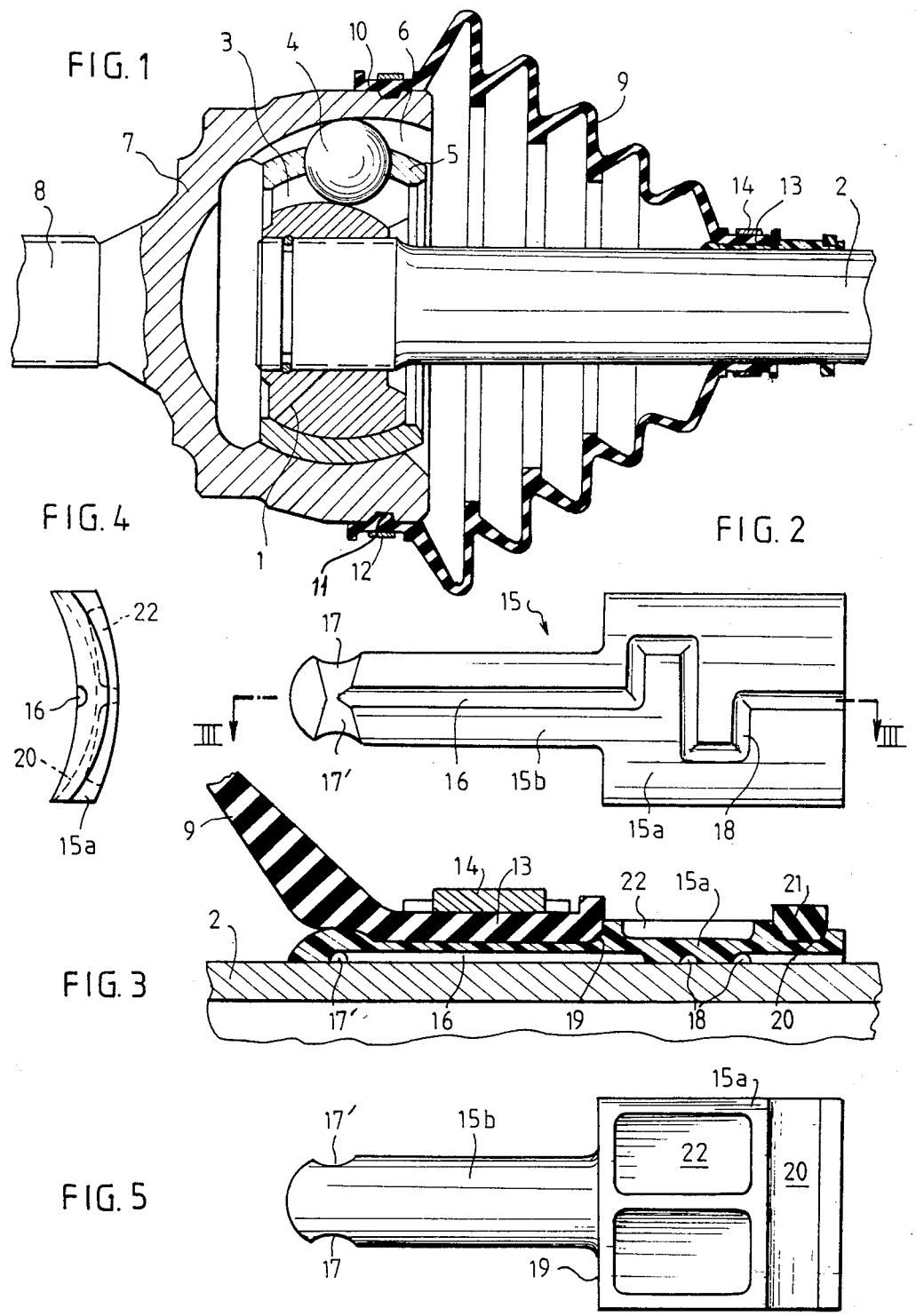

UNIVERSAL JOINT WITH BELLOWS SEAL AND VENT

FIELD OF THE INVENTION

The present invention relates to a universal joint of the type comprising an inner element fixed to a driving shaft, an outer element cooperating with the inner element and fixed with a driven shaft, and a tight casing in the form of bellows whose ends are respectively fixed to the driving shaft and to the outer element.

BACKGROUND OF THE INVENTION

When a universal joint of this type operates, there are variations in temperature which lead in particular to an increase in the pressure inside the joint and a deformation of the tight casing; such deformation, which is increased by the effect of the centrifugal force on the grease in the joint, tends to cause rapid deterioration of the tight casing.

To overcome this drawback, joints have been made in which the space inside the casing was connected to the atmosphere by a device interposed between the driving shaft and the casing and provided to this end with an inner groove.

For example, French Pat. No. 2 414 145 describes a universal joint in which the device for communicating with the atmosphere is constituted by a split elastic ring which is disposed between the tight casing and the driving shaft and is shaped so as to leave an air passage along the driving shaft when the sleeve of the casing is clamped on this shaft.

However, this device for communicating with the atmosphere has a number of drawbacks. When the driving shaft does not present a groove where the bellows is held, the elastic ring which has a relatively low coefficient of friction, less than that of the casing, may slide on the driving shaft. Furthermore, in the case of sliding universal joints in which the inner volume of the joint may vary rapidly, the grease contained in the casing may emerge through the groove of the ring.

OBJECT OF THE INVENTION

It is an object of the present invention to provide a universal joint provided with a device for communicating with the atmosphere which overcomes the drawbacks which have just been set forth.

SUMMARY OF THE INVENTION

According to the present invention, the device for communicating with the atmosphere is constituted by an element which is in the form of a portion of a cylinder and whose inner face comprises a groove presenting a baffle.

When the element in the form of a portion of a cylinder is interposed between the driving shaft and the casing, the contact between the rubber of the casing and the metal of the shaft is conserved over the major part of the circumference of the shaft. Said element is therefore held perfectly and cannot slide. The baffle with which the groove is provided avoids leakages of grease.

In a particular embodiment of the invention, the element for communicating with the atmosphere presents a zone of larger width on the inner face of which the baffle is formed, and a zone of smaller width on the inner face of which the groove extends axially; this groove preferably opens out via two grooves extending substantially in a plane perpendicular to the longitudinal direction of the element.

The element for communicating with the atmosphere may comprise, on the outer face of its zone of smaller width, a groove in which the corresponding end of the tight casing is maintained clamped.

The outer face of the zone of larger width of the element may comprise a groove in which is engaged a clamping band maintaining the element clamped on the driving shaft.

BRIEF DESCRIPTION OF THE DRAWING

The invention will be more readily understood on reading the following description with reference to the accompanying drawing, in which:

FIG. 1 is a view in axial section of the universal joint according to the invention;

FIG. 2 shows an internal view of the device for communicating with the atmosphere;

FIG. 3 is a view in longitudinal section, the element for communicating with the atmosphere being cut along line III—III of FIG. 2.

FIG. 4 is an end view of the element for communicating with the atmosphere;

FIG. 5 is an external plan view which shows the device for communicating with the atmosphere.

SPECIFIC DESCRIPTION

Referring now to the drawings, FIG. 1 shows the universal joint, in this case of the RZEPPA type, which comprises an inner element 1 fixed on a shaft 2 and provided on its periphery with grooves 3 in which balls 4 are engaged. The latter are maintained in a cage 5 and engaged, furthermore, in grooves 6 formed on the inner face of an outer element 7 of the joint, in the form of a bowl, which is fixed on the second shaft 8 of the joint.

A protecting casing 9 in the form of bellows, made of elastomer, has at one of its ends a fixing sleeve 10 engaged in a groove 11 in the outer element 7 and maintained in position by a clamping collar 12. At its other end, the casing has a fixing sleeve 13 which is fixed on the shaft 2 by a clamping collar 14, with the interposition of an element 15 for communicating with the atmosphere, made of plastic material.

As may be seen more particularly from FIGS. 2 to 5, the element 15 is in the form of a portion of a cylinder, i.e. a cylinder segment with an internal radius virtually equal to the radius of the shaft 2 and comprises a zone 15a of greater width and a zone 15b of smaller width. On the inner face lying in contact with the shaft 2 of the axially extending portion 15b of smaller width is made a groove 16 which, in the zone of small width 15b is axial, and opens out into two perpendicular (transverse) grooves 17 and 17'. In the zone 15a of large width, the groove has the form of a baffle 18, i.e. manders from side to side before opening axially to the outside.

The outer face of the zone 15b of small width is formed with a groove 19 in which the fixing sleeve 13 is disposed. On the outer face of the zone 15a of larger width is formed with a groove 20 in which is disposed a clamping collar or band 21 maintaining the end of the element 15 clamped on shaft 2, to avoid detachment of the element 15 under the effect of the centrifugal force. The element 15 may also be clamped on shaft 2 by the two tongues moulded with the element, which are circular in form and adapted to be clamped on the shaft by known means such as clipping means. Reference 22 denotes recesses made next to the groove 20 and intended to lighten the zone 15a of larger width and to give it greater flexibility.

When the joint operates, the space inside the bellows 9 communicates with the atmosphere via groove 16 and grooves 17 and 17'. However, the grease contained in these bellows is prevented by the baffle 18 from escaping.

In the claims:

1. A universal joint comprising:
   an inner element fixed to a driving shaft;
   an outer element fixed to a driven shaft and coupled with said inner element for joint rotation therewith;
   a bellows seal connected to one end with said outer element and having a sleeve to an opposite end thereof surrounding said driving shaft and directly contacting same; and
   a device communicating between the interior of said bellows seal and the atmosphere external of said bellows seal, said device comprising a cylindrical segment interposed between only a portion of said sleeve and said driving shaft, said cylindrical segment having an axially extending portion of relatively smaller circumferential width connected to a portion of relatively greater circumferential width, said segment being provided with an inner surface abutting said shaft and formed with a groove open toward said shaft having a rectilinear axially extending stretch in said axially extending portion communicating with said interior of said bellows seal and a meandering stretch forming a baffle in said portion of relatively greater circumferential width communicating with the external atmosphere.

2. The universal joint defined in claim 1 wherein said axially extending stretch of said groove communicates with the interior of said bellows seal by a pair of transverse grooves lying substantially in a plane perpendicular to the longitudinal dimension of said axially extending portion.

3. The universal joint defined in claim 1 wherein said device is composed of a plastic.

4. The universal joint defined in claim 1 wherein said portion of relatively greater circumferential width has on an outer surface thereof, a second transverse groove receiving a clamping band retaining said cylindrical segment on said driving shaft.

5. The universal joint defined in claim 1 wherein said axially extending portion is formed on an outer surface thereof with a first transverse groove receiving said portion of said sleeve, further comprising means for clamping said portion of said sleeve against said axially extending portion of said cylindrical segment.

6. The universal joint defined in claim 5 wherein said portion of relatively greater circumferential width has on an outer surface thereof, a second transverse groove receiving a clamping band retaining said cylindrical segment on said driving shaft.

* * * * *